US012768425B2

(12) United States Patent
Son

(10) Patent No.: US 12,768,425 B2
(45) Date of Patent: Oct. 20, 2026

(54) DAMPING FORCE VARIABLE VALVE ASSEMBLY AND DAMPING FORCE VARIABLE SHOCK ABSORBER INCLUDING THE SAME

(71) Applicant: HL Mando Corporation, Pyeongtaek-si (KR)

(72) Inventor: Byeongsang Son, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 388 days.

(21) Appl. No.: 18/379,623

(22) Filed: Oct. 12, 2023

(65) Prior Publication Data

US 2024/0418232 A1 Dec. 19, 2024

(30) Foreign Application Priority Data

Jun. 19, 2023 (KR) ........................ 10-2023-0077840

(51) Int. Cl.
*F16F 9/348* (2006.01)
*F16F 9/32* (2006.01)

(52) U.S. Cl.
CPC .......... *F16F 9/3484* (2013.01); *F16F 9/3485* (2013.01); *F16F 9/325* (2013.01); *F16F 2230/0029* (2013.01)

(58) Field of Classification Search
CPC .. F16F 9/325; F16F 9/342; F16F 9/348–3488; F16F 9/464; F16F 9/465; F16K 31/06–10
See application file for complete search history.

(56) References Cited

U.S. PATENT DOCUMENTS

| | | | | | |
|---|---|---|---|---|---|
| 6,000,508 | A * | 12/1999 | Forster | F16F 9/46 | 188/299.1 |
| 6,035,979 | A * | 3/2000 | Forster | F16F 9/34 | 188/266.6 |
| 6,044,939 | A * | 4/2000 | Forster | F16F 9/50 | 188/266.6 |
| 6,155,391 | A * | 12/2000 | Kashiwagi | F16F 9/466 | 188/266.6 |

(Continued)

FOREIGN PATENT DOCUMENTS

| | | |
|---|---|---|
| JP | H11-287281 A | 10/1999 |
| KR | 10-0265656 B1 | 10/2000 |

OTHER PUBLICATIONS

Office Action issued on Jun. 2, 2026, for corresponding Korean Patent Application No. 10-2023-0077840, along with an English machine translation (17 pages).

*Primary Examiner* — James J Taylor, II
(74) *Attorney, Agent, or Firm* — Hauptman Ham, LLP

(57) ABSTRACT

A damping force variable valve assembly including: an integrated soft valve port having one end connected to a shock absorber, a connection passage with a working fluid flowing therethrough from the shock absorber, and a valve disk provided at a bottom surface of the integrated soft valve port to be in close contact therewith; a valve housing having a hollow cylindrical shape, and having an inner circumferential surface of a front end coupled to an outer circumferential surface of the integrated soft valve port; and a main valve part disposed underneath the integrated soft valve port in the valve housing.

17 Claims, 9 Drawing Sheets

(56) References Cited

U.S. PATENT DOCUMENTS

| | | | | |
|---|---|---|---|---|
| 6,527,093 B2 * | 3/2003 | Oliver | F16F 9/464 | |
| | | | 188/315 | |
| 8,220,604 B2 * | 7/2012 | Jee | F16F 9/325 | |
| | | | 188/266.6 | |
| 2021/0283974 A1 * | 9/2021 | Kim | F16F 9/185 | |

* cited by examiner

DAMPING FORCE VARIABLE VALVE ASSEMBLY AND DAMPING FORCE VARIABLE SHOCK ABSORBER INCLUDING THE SAME

CROSS-REFERENCE TO RELATED APPLICATION

This application claims priority to and the benefit of Korean Patent Application No. 10-2023-0077840 filed on Jun. 19, 2023, in the Korean Intellectual Property Office, the entire disclosure of which is incorporated herein by reference for all purposes.

TECHNICAL FIELD

The present disclosure relates to a damping force variable valve assembly and a damping force variable shock absorber including the same, and more specifically, to a damping force variable valve assembly that is easy to assemble and capable of reducing an overall size thereof and a damping force variable shock absorber including the same.

BACKGROUND

In general, a shock absorber is installed in means of transportation, such as an automobile or the like, and improves ride comfort by absorbing and damping a vibration or shock transferred from a road surface during driving.

Each shock absorber includes a piston rod installed inside a cylinder to enable compression and rebound strokes, and a piston valve coupled to the piston rod and positioned inside the cylinder to generate a damping force.

When the damping force is set to be low, the shock absorber may improve ride comfort by absorbing a vibration caused by unevenness of a road surface.

Recently, a damping force variable shock absorber capable of setting different characteristics of a damping force according to the purpose of use of a vehicle have been applied to vehicles.

Such a damping force variable shock absorber further includes a damping force variable valve assembly for adjusting a damping force, and the damping force variable shock absorber may switch a damping force between a hard mode in which a spool of a solenoid closes an auxiliary passage to generate a high damping force and a soft mode in which the spool opens the auxiliary passage to generate a low damping force.

FIG. 1 is a view showing a damping force variable shock absorber according to a related art.

A damping force variable shock absorber according to the related art includes a cylinder 10 having an outer cylinder 11, an inner cylinder 12, a piston rod 13, a piston valve 14, a reservoir chamber 15, a separator tube 16, and a damping force variable valve assembly 100.

The damping force variable valve assembly 100 is installed outside the outer cylinder 11, and the inner cylinder 12 is installed inside the outer cylinder 11 at a predetermined interval.

In addition, the reservoir chamber 15 is formed between the outer cylinder 11 and the inner cylinder 12 to form a low pressure chamber PL and a high pressure chamber PH.

With one end coupled to the piston valve 14 located inside the inner cylinder 12, the piston rod 13 reciprocates in compression and rebound stroke directions.

In a state in which the piston valve 14 is coupled to one end of the piston rod 13, the inner cylinder 12 is divided into a compression chamber 12*a* and a rebound chamber 12*b* in a longitudinal direction, and in this state, while the piston rod 13 reciprocates in the compression and rebound stroke directions, a damping force is generated due to resistance of a fluid.

The reservoir chamber 15 is provided in a space between the outer cylinder 11 and the inner cylinder 12.

The separator tube 16 is provided between the outer cylinder 11 and the inner cylinder 12, specifically, on an outer surface of the inner cylinder 12 to form the high pressure chamber PH on the inside and the low pressure chamber LH on the outside.

That is, the separator tube 16 divides the inside of the reservoir chamber 15 into the low pressure chamber PL and the high pressure chamber PH.

A body valve 17 is installed at a bottom of the inner cylinder 12 and controls a flow of a working fluid between the reservoir chamber 15 and the compression chamber 12*a* to generate a damping force.

Meanwhile, the high pressure chamber PH is connected to the rebound chamber 12*b* through an inner hole 12*c* provided in the inner cylinder 12, and the low pressure chamber PL is connected to the compression chamber 12*a* through a lower passage formed between the body valve 17 and the outer cylinder 11 and a passage (not shown) formed in the body valve 17.

FIG. 2 is a view showing a structure of a damping force variable valve assembly employed in the damping force variable shock absorber of FIG. 1, FIG. 3 is an enlarged view of a port and a soft valve part of FIG. 2, and FIG. 4 is a view showing a state in which a valve mount is removed from FIG. 3.

The damping force variable valve assembly 100 according to the related art includes a port 110, a valve housing 120, a soft valve part 130, a main valve part 140, a safe valve part 150, and a solenoid part 160.

A front end of the port 110 is connected to the high pressure chamber PH through the outer cylinder 11 and the separator tube 16, and a connection passage 111 is formed to pass through the port 110 in a back-and-forth direction so that a working fluid from the high pressure chamber PH can flow into the variable valve assembly.

That is, an inlet of the connection passage 111 is connected to the high pressure chamber PH, and an outlet thereof is connected to a pilot chamber 123 and a poppet chamber 125 of the valve housing 120.

A washer 113 for fixation may be provided outside the port 110.

In addition, a protrusion contacting an upper surface of a soft valve body 131 is formed at a bottom surface of a support part 115 protruding horizontally from each of both lower sides of the port 110.

Such a protrusion seals an area between the port 110 and the soft valve body 131.

The valve housing 120 is formed of a cylindrical metal material, and the soft valve part 130, the main valve part 140, and the safe valve part 150 may be sequentially assembled in the inner hollow space of the valve housing 120.

The hollow inner space of the valve housing 120 may be partitioned by a plate-shaped valve base 121.

The valve housing 120 has the pilot chamber 123 provided above the valve base 121, and the poppet chamber 125 provided below the valve base 121, and the two chambers 123 and 125 may communicate with each other through a base hole 122 provided in the valve base 121.

The pilot chamber 123 forms a relatively wider space than the poppet chamber 125.

The pilot chamber 123 forms a plurality of steps in the hollow inner surface along a longitudinal direction, and the soft valve part 130 and the main valve part 140 are sequentially provided in each of the plurality of steps from the inlet of the port.

A plurality of passage holes 126 for forming a main passage is provided in a circumferential direction at an intermediate height of the valve housing 120 where the main valve part 140 is located, so that the inside and outside of the valve housing 120 can communicate with each other.

The poppet chamber 125 has a smaller volume than that of the pilot chamber 123, and the safe valve part 150 is located inside the poppet chamber 125.

The soft valve part 130 communicates with the connection passage 111 of the port 110, so that a fluid passing through the port 110 first passes through the valve housing 120.

The soft valve part 130 includes a soft valve body 131, a valve disk 133, and a valve mount 135.

The soft valve body 131 is provided in a cylindrical shape, a valve mount 135 passes through the center of the soft valve body 131, and at least one soft passage 132 passes through the soft valve body 131 in a circumferential direction.

The valve disk 133 is provided in a plate shape, and provided at a bottom surface of the soft valve body 131 to be in close contact therewith, for example, on the opposite side of the port 110.

The valve disk 133 may be installed as a plurality of disks stacked.

The valve mount 135 is coupled to the soft valve body 131, supporting the valve disk 133 to maintain the soft passage 132 in a normally closed state.

The valve mount 135 may be provided as a rivet or pin and coupled to the soft valve body 131.

The soft valve part 130 is coupled to an inlet-side end of the valve housing 120 to selectively allow communication between the port 110 and the pilot chamber 123.

In particular, since the soft valve part 130 is configured as a single independent part, a degree of freedom in tuning, such as minimizing a damping force of the main valve part in the soft mode while adjusting the damping force at a low speed, required through individual design, may be greatly increased, for example.

The main valve part 140 is accommodated in the pilot chamber 123 of the valve housing 120, and may include a valve seat 141, a valve body 143, and a valve spring 145.

The valve seat 141 is provided in a ring shape.

In addition, using a step provided at the outside of the valve seat 141, the valve seat 141 may be supported on the locking jaw 127 provided in an inner surface of the valve housing 120.

A lower end of the valve seat 141 selectively contacts an upper end of the valve body 143 and communicates a main passage between the pilot chamber 123 and the valve housing 120.

The valve body 143 is coupled to the pilot chamber 123 such that the valve body 132 is vertically movable.

The valve body 143 includes a disc-shaped body disk 143*a*, and upper and lower rims 143*b* and 143*c* respectively extending upward and downward of the body disk 143*a*.

The body disk 143*a* has a body hole 144 at the center thereof to communicate the front and rear of the body disk 143*a*.

An upper end of the upper rim 143*b* selectively comes into contact with or is separated from a lower end of the valve seat 141, and a lower end of the lower rim 143*c* is elastically supported toward the port side via the valve spring 145.

The valve spring 145 may be provided in a coil spring shape.

The safe valve part 150 is provided in the poppet chamber 125, and the safe valve part 150 is provided between the valve housing 120 and the solenoid part 160.

The solenoid part 160 is driven by a current transmitted from an outside, and the solenoid part 160 moves a protruding rod 162 forward and backward using an electromagnetic force generated by excitation of a coil when a current is supplied.

In addition, a bypass passage 170 is provided between the valve housing 120 and the solenoid part 160.

The bypass passage 170 connects the inside of the poppet chamber 125 and the reservoir chamber 15.

Specifically, the bypass passage 170 has an inlet connected to the inside of the poppet chamber 125 and an outlet connected to the low pressure chamber PL of the reservoir chamber 15, so that a working fluid of the poppet chamber 125 moves to the lower pressure chamber PL in the hard mode (soft mode), the soft mode (soft mode) mode), and the fail mode.

However, in the conventional damping force variable valve assembly configured as described above, the port 110 and the soft valve part 130 are provided separately, and thus, sealing between the port 110 and the soft valve body 131 is required.

As a result, it leads to an increased number of parts, a complicated assembly process, and an increased size of the valve assembly.

SUMMARY

The present disclosure has been made to solve the aforementioned various problems of the related art, and specifically, the present disclosure provides a damping force variable valve assembly easy to assemble and capable of reducing an overall size thereof, and a damping force variable shock absorber including the same.

In order to achieve the above objects, the present disclosure may provide a damping force variable valve assembly including: an integrated soft valve port having one end connected to a shock absorber, a connection passage with a working fluid flowing therethrough from the shock absorber, and a valve disk provided at a bottom surface of the integrated soft valve port to be in close contact therewith; a valve housing having a hollow cylindrical shape, and having an inner circumferential surface of a front end coupled to an outer circumferential surface of the integrated soft valve port: and a main valve part disposed underneath the integrated soft valve port in the valve housing.

A fitting hole may be formed at a center of the integrated soft valve port to pass therethrough, and a valve mount for fixing the valve disk may be fitted into the fitting hole.

The valve disk may be provided in the form of a plurality of disks stacked.

The valve disk is coupled to the bottom surface of the integrated soft valve port while the connection passage is in a normally closed state.

The connection passage may be formed in plural.

The integrated soft valve port may include: a main body formed in a disk shape of a predetermined thickness, having a fitting hole formed at a center of the main body to pass therethrough and allowing a valve mount for fixing the valve disk to be fitted therein, and a connection passage formed outside the fitting hole; and a sub body having a predetermined thickness, extending horizontally along a circumference of a lower end of the main body, and having a protrusion formed in a bottom surface of the sub body so as to come into contact with an upper surface of the valve disk.

The sub body may include: a first sub body extending horizontally along the circumference of the lower end of the main body and protruding downward along a bottom surface rim; and a second sub body extending downward along a bottom surface rim of the first sub body.

A bottom surface of the main body and a bottom surface of the first sub body may be located on a same plane.

The valve disk may be located in a mounting groove formed between an inner circumferential surface of the second sub body and the bottom surface of the main body and the first sub body.

A support part may be formed in an outer circumferential surface of the second sub body to protrude horizontally at a predetermined interval along a circumferential direction.

It is preferable that the support part is provided as three support parts and disposed at an interval of 120° along the circumferential direction.

An outer circumferential surface of the support part may contact an inner circumferential surface of the valve housing and a bottom surface of the support part may contact an upper surface of the main valve part, so that the integrated soft valve port maintains a stable state within the valve housing.

The connection passage formed in the main body may be formed in plural outside the fitting hole along the circumferential direction.

The valve mount may be provided in a rivet or pin form.

In another aspect, the present disclosure may provide a damping force variable valve assembly including: an integrated soft valve port having one end connected to a shock absorber, a valve disk provided at a bottom surface of the integrated soft valve port and provided as a plurality of disks stacked, a fitting hole into which a valve mount for fixing the valve disk is fitted, and a plurality of connection passages formed a circumferential direction outside the fitting hole so that a working fluid is introduced from the shock absorber; a valve housing having a hollow cylindrical shape, and having an inner circumferential surface of a front end coupled to an outer circumferential surface of the integrated soft valve port: and a main valve part disposed underneath the integrated soft valve port in the valve housing.

The valve disk is coupled to a bottom surface of the integrated soft valve port while the connection passage is in a normally closed state.

The integrated soft valve port may include: a main body formed in a disk shape of a predetermined thickness, having a fitting hole formed at a center of the main body to pass therethrough and allowing a valve mount for fixing the valve disk to be fitted thereinto, and having a connection passage formed outside the fitting hole; and a sub body having a predetermined thickness, extending horizontally along a circumference of a lower end of the main body, and having a protrusion formed in a bottom surface of the sub body so as to come into contact with an upper surface of the valve disk.

The sub body may include: a first sub body extending horizontally along the circumference of the lower end of the main body and protruding downward along a bottom surface rim; and a second sub body extending downward along a bottom surface rim of the first sub body.

A bottom surface of the main body and a bottom surface of the first sub body may be located on a same plane, and the valve disk may be located in a mounting groove formed between an inner circumferential surface of the second sub body and a bottom surface of the main body and the first sub body.

Meanwhile, the present disclosure provides a damping force variable shock absorber including the above-described damping force variable valve assembly.

Specific descriptions of other Examples are included in "DETAILED DESCRIPTION" and "Drawings".

Advantages and/or technical features of the present disclosure as well as methods of obtaining the same will be clearer with reference to the accompanying embodiments.

However, the present disclosure is not limited to the configurations of the embodiments described below and may be embodied in various other forms, each embodiment disclosed in this specification is intended to be illustrative only, and it will be understood by those of ordinary skill in the art that various changes in form and details may be made therein without departing from the spirit and scope of the present disclosure as defined by the appended claims.

According to the above, the present disclosure has the following effects.

The present disclosure has an effect of facilitating assembling of the valve assembly and reducing an overall size of the valve assembly by providing an integrated soft valve port in which a conventional port and a conventional soft valve part are integrated.

Thus, it is possible to cope with the automobile industry's demand for simplification of not only a suspension but also a structure of a steering and driving system and for reduction in size of a damper to improve ride comfort and adjustment stability and secure an interior space.

DETAILED DESCRIPTION

Hereinafter, a preferred embodiment of a damping force variable valve assembly and a damping force variable shock absorber including the same according to the present disclosure will be described in detail based on the accompanying drawings. For reference, the terms and words used in the present disclosure and claims of the present disclosure should not be construed as limited to a lexical meaning, and should be understood as appropriate notions by the inventor based on the fact that he/she is able to define terms to describe his/her disclosure in the best way to be seen by others. In addition, embodiments and drawings described in the present disclosure are simply the most preferred embodiment and do not represent all the technical spirits of the present disclosure, and it will be understood that various modifications and equivalents may be made to take the place of the embodiments at the time of filing the present application.

Figure 1:
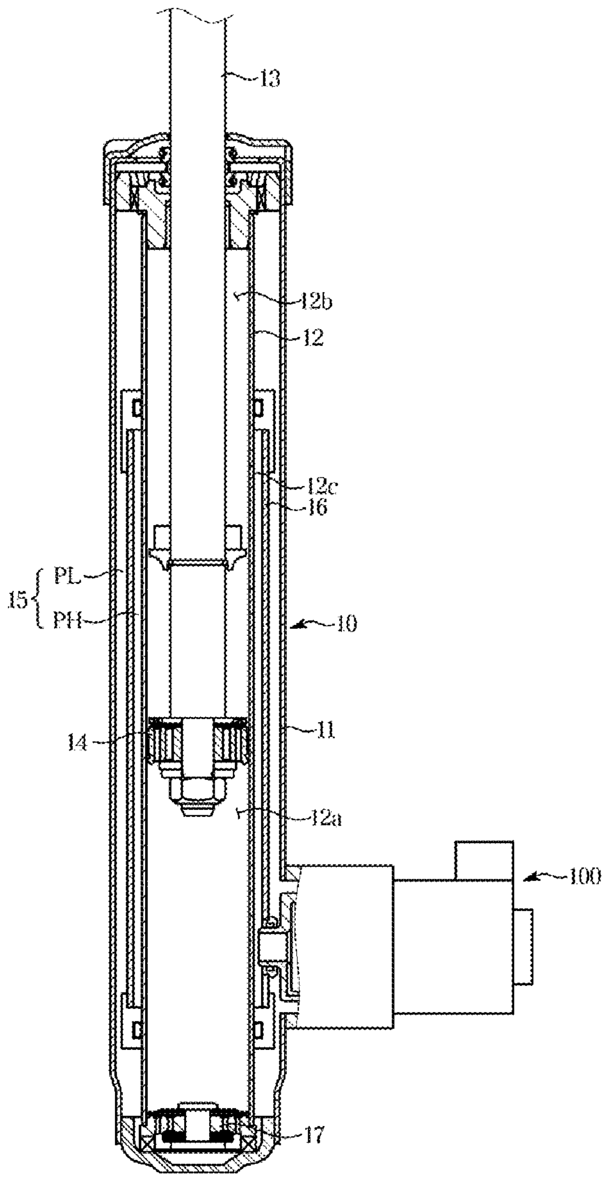
FIG. 1 Prior Art
FIG. 1 is a view showing a damping force variable shock absorber according to a related art.
Figure 2:
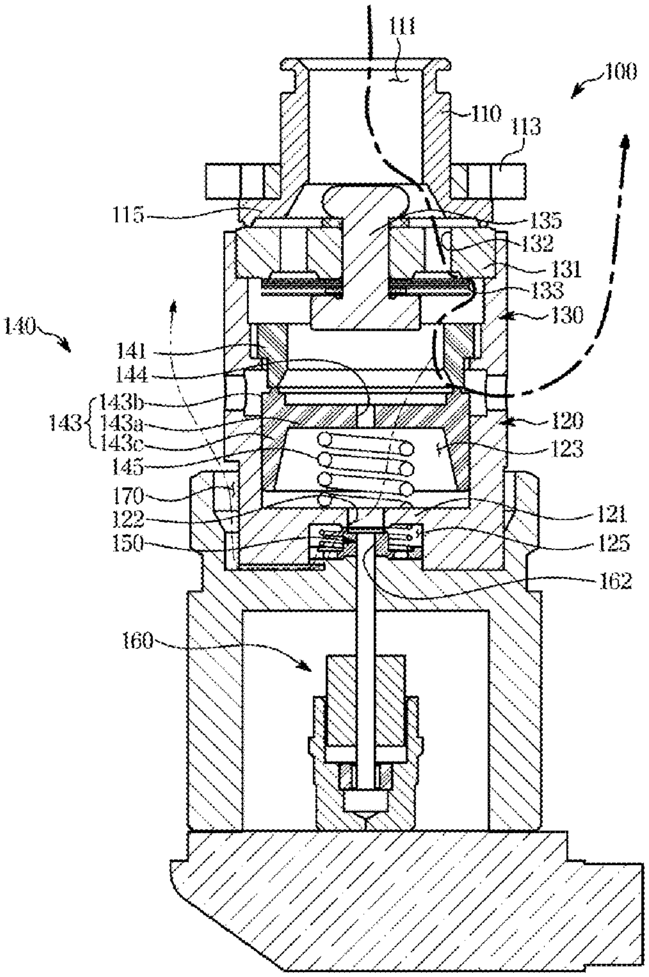
FIG. 2 Prior Art
FIG. 2 is a view showing a structure of a damping force variable valve assembly employed in the damping force variable shock absorber of FIG. 1.
Figure 3:
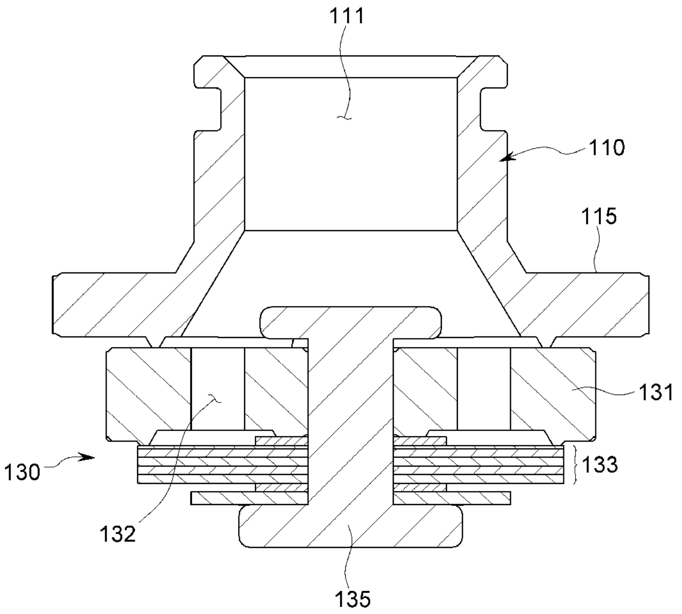
FIG. 3 Prior Art
FIG. 3 is an enlarged view of a port and a soft valve in FIG. 2.
Figure 4:
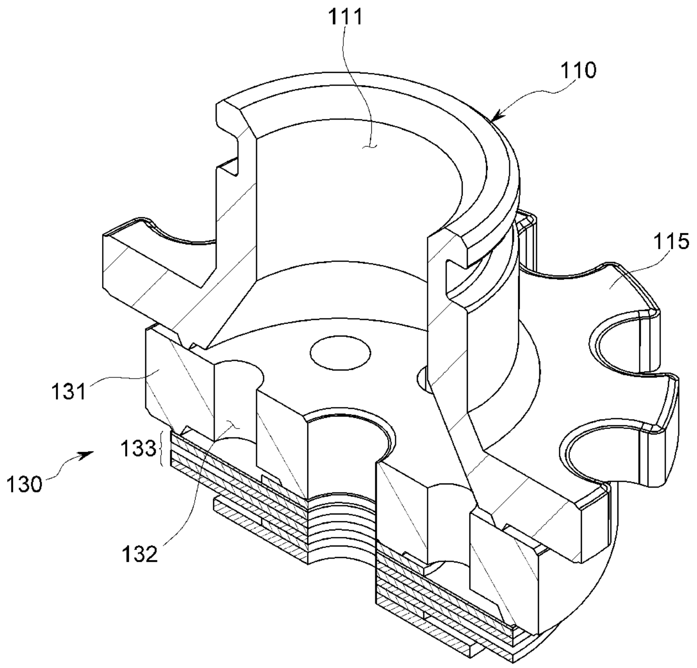
FIG. 4 Prior Art
FIG. 4 is a view showing a state in which a valve mount is removed in FIG. 3.
Figure 5:
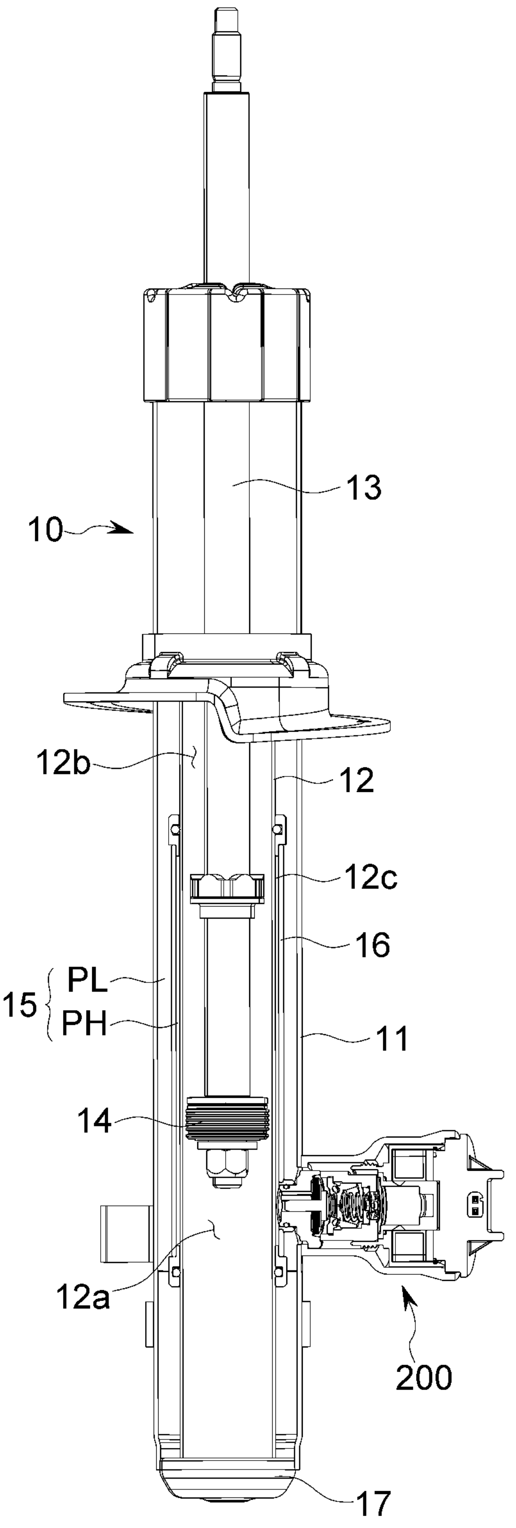
FIG. 5 is a view showing a damping force variable shock absorber according to the present disclosure.

FIG. 5 is a view showing a damping force variable shock absorber according to the present disclosure.

A damping force variable shock absorber according to the present disclosure includes a cylinder 10 having an outer cylinder 11 and an inner cylinder 12, a piston rod 13, a piston valve 14, a reservoir chamber 15, a separator tube 16, and a damping force variable valve assembly 200.

The damping force variable valve assembly 200 is installed at the outside of the outer cylinder 11, and the inner cylinder 12 is installed inside the outer cylinder 11 at a predetermined interval.

In addition, the reservoir chamber 15 is formed between the outer cylinder 11 and the inner cylinder 12 to form a low pressure chamber PL and a high pressure chamber PH.

With one end coupled to the piston valve 14 located inside the inner cylinder 12, the piston rod 13 reciprocates in compression and rebound stroke directions.

In a state in which the piston valve 14 is coupled to one end of the piston rod 13, the inner cylinder 12 is divided into a compression chamber 12*a* and a rebound chamber 12*b* in a longitudinal direction, and while the piston rod 13 reciprocates in the compression and rebound stroke directions, a damping force is generated due to resistance of a fluid.

The reservoir chamber 15 is provided in a space between the outer cylinder 11 and the inner cylinder 12.

The separator tube 16 is provided between the outer cylinder 11 and the inner cylinder 12, specifically, on an outer surface of the inner cylinder 12 to form the high pressure chamber PH on the inside and the low pressure chamber LH on the outside.

That is, the separator tube 16 divides the inside of the reservoir chamber 15 into the low pressure chamber PL and the high pressure chamber PH.

A body valve 17 is installed at a bottom of the inner cylinder 12 and controls a flow of a working fluid between the reservoir chamber 15 and the compression chamber 12*a* to generate a damping force.

Meanwhile, the high pressure chamber PH is connected to the rebound chamber 12*b* through an inner hole 12*c* provided in the inner cylinder 12, and the low pressure chamber PL is connected to the compression chamber 12*a* through a lower passage formed between the body valve 17 and the outer cylinder 11 and a passage (not shown) formed in the body valve 17.

Figure 6:
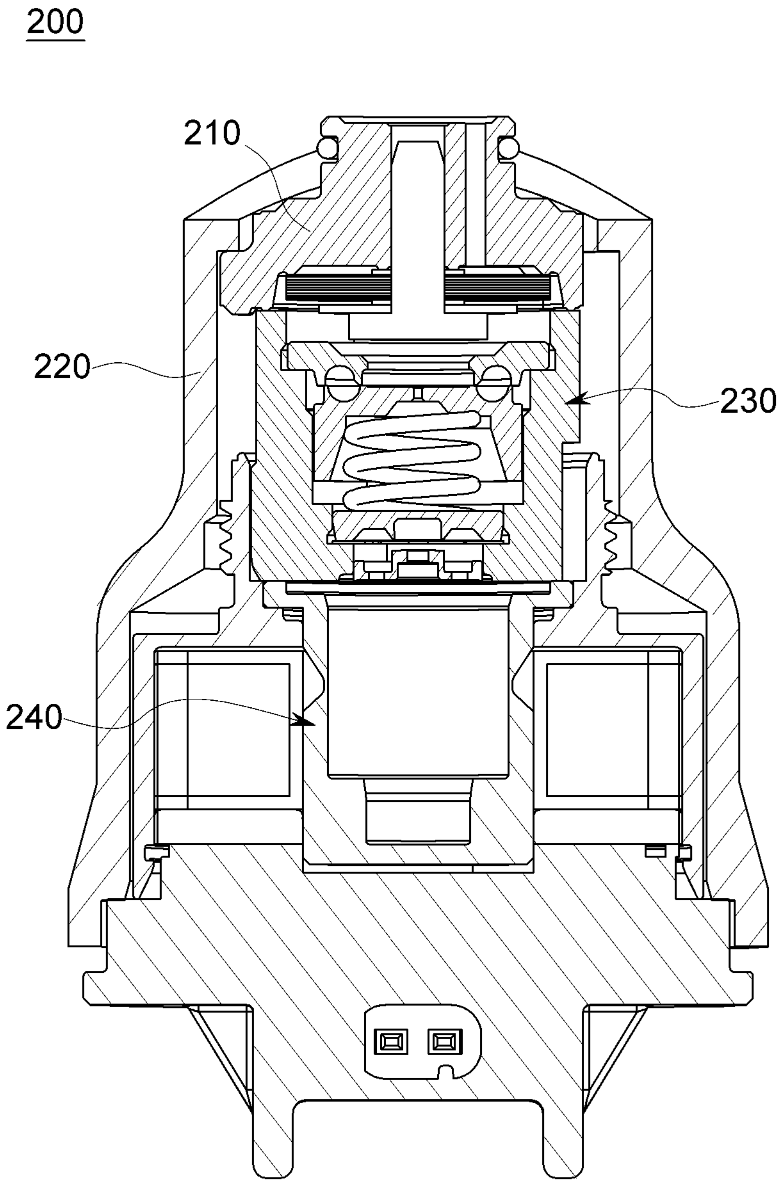
FIG. 6 is a view showing a structure of a damping force variable valve assembly employed in the damping force variable shock absorber of FIG. 5.

FIG. 6 is a view showing a structure of a damping force variable valve assembly employed in the damping force variable shock absorber of FIG. 5.

The damping force variable valve assembly 200 according to the present disclosure may include an integrated soft valve port 210, a valve housing 220, a main valve part 230, and a solenoid part 240.

One end of the integrated soft valve port 210 is connected to the shock absorber, a connection passage 211*b* passes through the integrated soft valve port 210 so that a working fluid flows from the shock absorber, and the valve disk 217 is provided at a bottom surface of the integrated soft valve port 210 in close contact therewith.

A fitting hole 211*a* may be formed at a center of the integrated soft valve port 210 to pass therethrough, and a valve mount 219 in the form of a rivet or pin to fix the valve disk 217 may be fitted into the fitting hole 211*a*.

In addition, the valve disk 217 may be coupled to the bottom surface of the integrated soft valve port 210 while the connection passage 211*b* formed in the integrated soft valve port 210 is in a normally closed state.

In addition, the connection passage 211*b* of the integrated soft valve port 210 may be formed in plural.

The valve housing 220 has a hollow cylindrical shape, and an inner circumferential surface of the front end of the valve housing 220 is coupled to an outer circumferential surface of the integrated soft valve port 210.

The main valve part 230 is disposed underneath the integrated soft valve port 210 in the valve housing 220.

The integrated soft valve port 210 of the damping force variable valve assembly 200 according to the present disclosure is a port in which the port and the soft valve part in the conventional variable damping valve assembly are integrated, thereby facilitating assembling of the valve assembly 200 and reducing an overall size of the valve assembly 200.

In the damping force variable valve assembly 200 according to the present disclosure, except for the integrated soft valve port 210, the remaining components such as the valve housing 220, the main valve part 230, and the solenoid part 240 are the same as those in the related art, and thus, a description thereof will be herein omitted.

Figure 7:
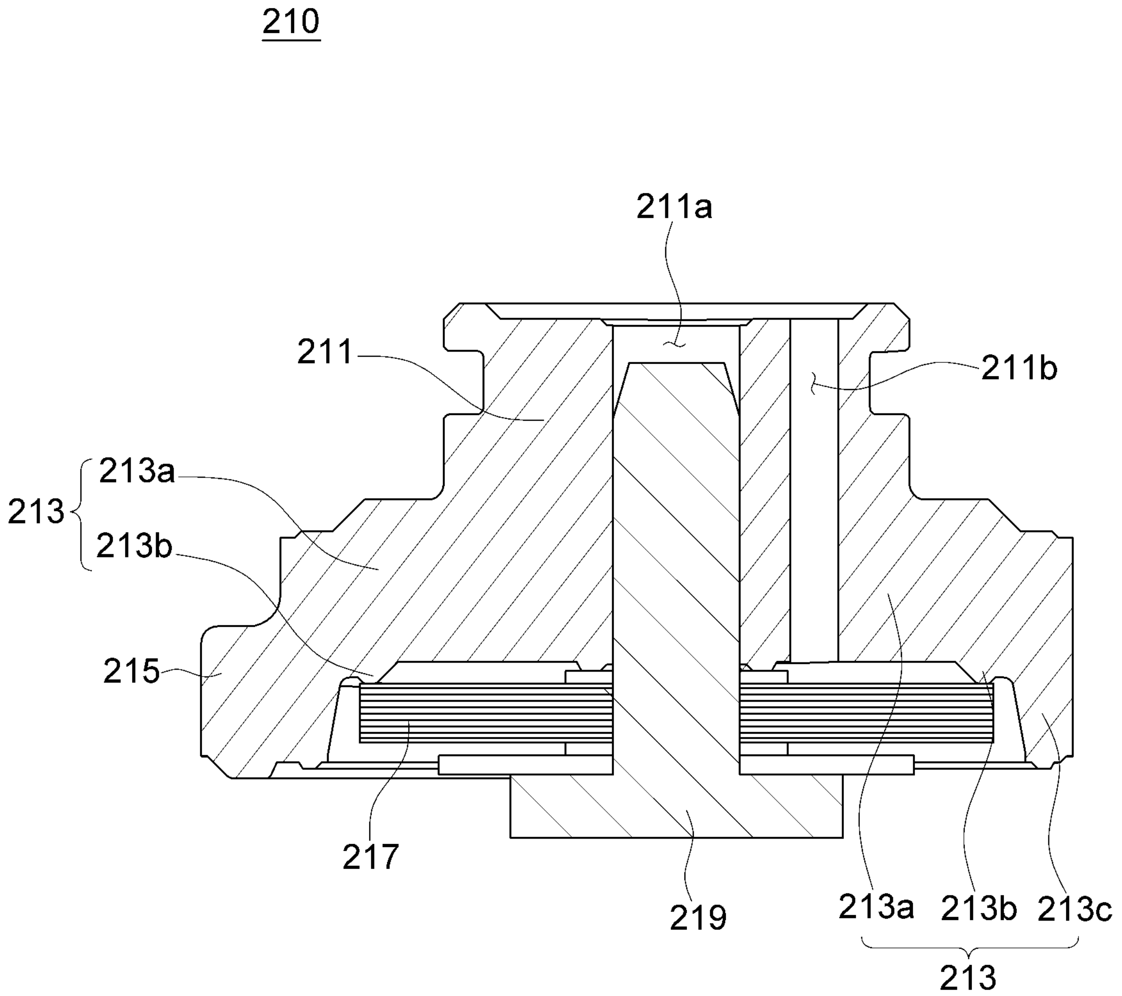
FIG. 7 is an enlarged view of an integrated soft valve port in FIG. 6.
Figure 8:
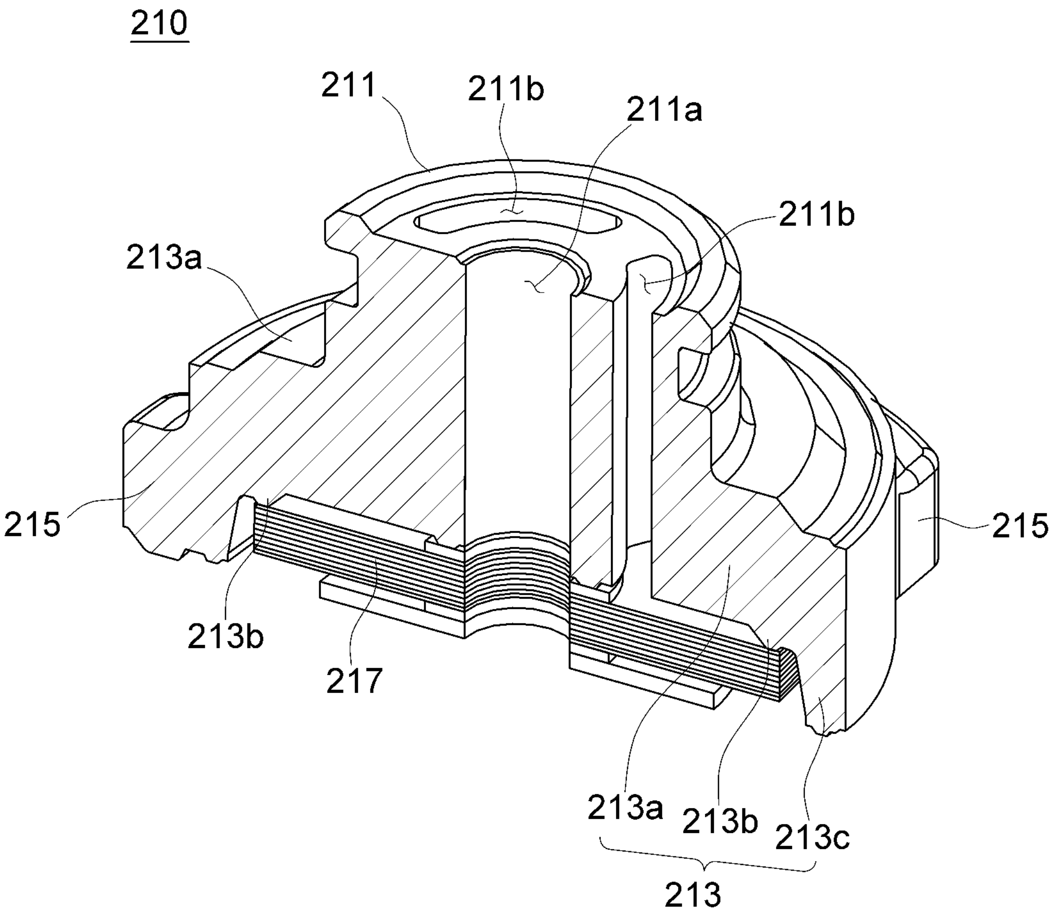
FIG. 8 is a view showing a state in which a valve mount is removed from FIG. 7.
Figure 9:
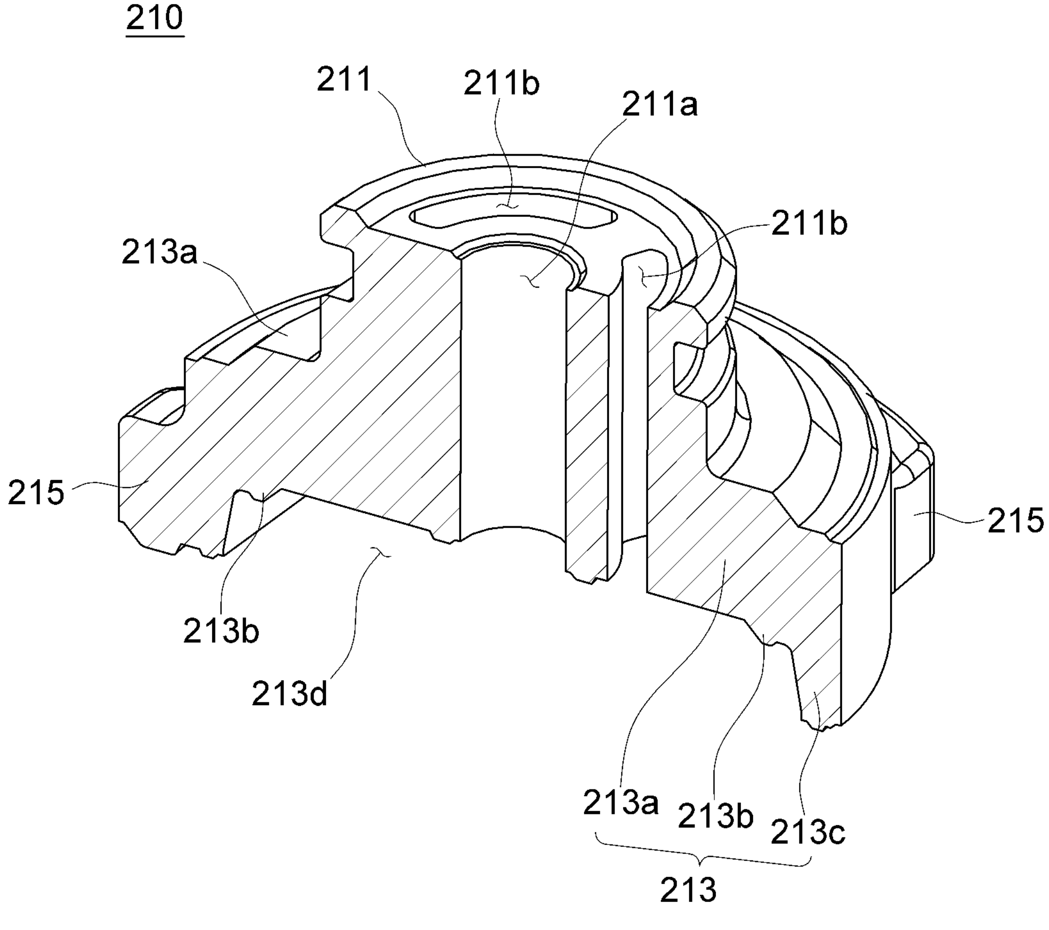
FIG. 9 is a view showing a state in which a valve disk is removed from the integrated soft valve port of FIG. 8.

FIG. 7 is an enlarged view of the integrated soft valve port of FIG. 6, FIG. 8 is a view showing a state in which the valve mount is removed from FIG. 7, and FIG. 9 is a view showing a state in which a valve disk is removed from the soft valve port of FIG. 8.

The integrated soft valve port 210 may include a main body 211, a sub body 213, a support part 215, a valve disk 217, and a valve mount 219.

The main body 211 is formed in a disk shape of a predetermined thickness, a fitting hole 211*a* into which a valve mount 219 in the form of a pin or a rivet to fix the valve disk 217 is fitted is formed at the center of the main body 211 to pass therethrough, and a connection passage 211*b* is formed outside the fitting hole 211*a*.

In this case, a plurality of connection passages 211*b* formed in the main body 211 may be provided outside the fitting hole 211*a* along a circumferential direction.

The sub body 213 has a predetermined thickness and extends horizontally along a circumference of a lower end of the main body 211, and a protrusion 213*b* is formed in a bottom surface of the sub body 213 to come into contact with an upper surface of the valve disk 217.

The sub body 213 may include a first sub body 213*a* extending horizontally along a circumference of a lower end of the main body 211 and having a protrusion part 213*b* protruding downward along a bottom surface rim; and a second sub body 213*c* extending downward along a bottom surface rim of the first sub body 213*a*.

In this case, it is preferable that the bottom surface of the main body 211 and the bottom surface of the first sub body 213*a* are located on the same plane.

In addition, in a mounting groove 213*d* formed between an inner circumferential surface of the second sub body 213*c* and the bottom surface of the main body 211 and the first sub body 213*a*, a plurality of valve disks 217 each in the form of a plates may be located in a stacked state.

In addition, a support part 215 may be formed in an outer circumferential surface of the second sub body 213*c* to protrude horizontally at a predetermined interval along a circumferential direction.

It is preferable that the support part 215 is provided as three support parts and disposed at an interval of 120° along the circumferential direction.

In this case, an outer circumferential surface of a support part 215 is in contact with an inner circumferential surface of the valve housing 220 and a bottom surface of the support part 215 is in contact with an upper surface of the main valve part 230, so that the integrated soft valve port 210 maintains a stable state within the valve housing 220.

As the minimum number of support parts 215 is provided as described above, it is possible to reduce manufacturing costs including mold costs while maintaining durability.

The valve disk 217 may be provided in the form of a plurality of plate-shaped disks stacked.

A through-hole (not shown) is formed at the center of the valve disk 217, so that a valve mount 219 formed of a pin or rivet can be fitted into the through-hole.

The valve mount 219 may be fitted into the fitting hole 211*a* formed in the main body 211 and the through hole (not shown) formed in the valve disk 217.

As described above, the present disclosure provides an integrated soft valve port 210 in which a conventional port and a conventional soft valve part are integrated, and thus, it is possible to facilitate assembling of the valve assembly 200 and reduce the overall size of the valve assembly 200.

Thus, it is possible to cope with the automobile industry's demand for simplification of not only a suspension but also a structure of a steering and driving system and for reduction in size of a damper to improve ride comfort and adjustment stability and secure an interior space.

The present disclosure described above is not limited to the embodiments and accompanying drawings, and within the scope of the technical concept of the present disclosure, various substitutions, modifications, and alterations are possible for those skilled in the art without departing from the scope of the present disclosure, which will be apparent to those skilled in the art.

| [Detailed Description of Main Elements] | |
|---|---|
| 10: cylinder | 15: reservoir chamber |
| 11: outer cylinder | 16: separator tube |
| 12: inner cylinder | 17: body valve |
| 13: piston rod | 200: damping force variable valve assembly |
| 14: piston valve | 210: integrated soft valve port |
| 211: main body | 219: valve mount |
| 213: sub body | 220: valve housing |
| 215: support part | 230: main valve part |
| 217: valve disk | 240: solenoid part |

What is claimed is:

1. A damping force variable valve assembly comprising:

an integrated soft valve port having one end connected to a shock absorber, a connection passage with a working fluid flowing therethrough from the shock absorber, and a valve disk provided at a bottom surface of the integrated soft valve port to be in close contact therewith;

a valve housing having a hollow cylindrical shape, and having an inner circumferential surface of a front end coupled to an outer circumferential surface of the integrated soft valve port;

a main valve part disposed underneath the integrated soft valve port in the valve housing, wherein a plurality of support parts are formed in the outer circumferential surface of the integrated soft valve port to protrude horizontally, the support parts being disposed at predetermined intervals along a circumferential direction, wherein the support parts are provided as three support parts and disposed at the predetermined intervals of 120° along the circumferential direction.

2. The damping force variable valve assembly of claim 1, wherein a fitting hole is formed at a center of the integrated soft valve port to pass therethrough, and a valve mount for fixing the valve disk is fitted into the fitting hole.

3. The damping force variable valve assembly of claim 2, wherein the valve disk is provided in the form of a plurality of disks stacked.

4. The damping force variable valve assembly of claim 3, wherein the valve disk is coupled to the bottom surface of the integrated soft valve port while the connection passage is in a normally closed state.

5. The damping force variable valve assembly of claim 1, wherein the connection passage is formed in plural.

6. The damping force variable valve assembly of claim 1, wherein the integrated soft valve port comprises:

a main body formed in a disk shape of a predetermined thickness, having a fitting hole formed at a center of the main body to pass therethrough and allowing a valve mount for fixing the valve disk to be fitted therein, and the connection passage formed outside the fitting hole; and a sub body having a predetermined thickness, extending horizontally along a circumference of a lower end of the main body, and having a protrusion formed in the bottom surface of the integrated soft valve port so as to come into contact with an upper surface of the valve disk.

7. The damping force variable valve assembly of claim 6, wherein the sub body comprises:

a first sub body extending horizontally along the circumference of the lower end of the main body and protruding downward along a bottom surface rim; and a second sub body extending downward along a bottom surface rim of the first sub body.

8. The damping force variable valve assembly of claim 7, wherein the valve disk is located in a mounting groove formed between an inner circumferential surface of the second sub body and the bottom surface of the integrated soft valve port.

9. The damping force variable valve assembly of claim 6, wherein the connection passage formed in the main body is formed in plural outside the fitting hole along the circumferential direction.

10. The damping force variable valve assembly of claim 6, wherein the valve mount is provided in a rivet or pin form.

11. The damping force variable valve assembly of claim 1, wherein the outer circumferential surface of the integrated soft valve port contacts the inner circumferential surface of the valve housing and a bottom surface of the support parts contact an upper surface of the main valve part, so that the integrated soft valve port maintains a stable state within the valve housing.

12. A damping force variable valve assembly comprising:

an integrated soft valve port having one end connected to a shock absorber, a valve disk provided at a bottom surface of the integrated soft valve and provided as a plurality of disks stacked, a fitting hole into which a valve mount for fixing the valve disk is fitted, and a plurality of connection passages formed a circumferential direction outside the fitting hole so that a working fluid is introduced from the shock absorber;

a valve housing having a hollow cylindrical shape, and having an inner circumferential surface of a front end coupled to an outer circumferential surface of the integrated soft valve port;

a main valve part disposed underneath the integrated soft valve port in the valve housing, wherein a plurality of support parts are formed in the outer circumferential surface of the integrated soft valve port to protrude horizontally, the support parts being disposed at predetermined intervals along the circumferential direction, wherein the support parts are provided as three support parts and disposed at the predetermined intervals of 120° along the circumferential direction.

13. The damping force variable valve assembly of claim 12, wherein the valve disk is coupled to the bottom surface of the integrated soft valve port while the connection passages are in a normally closed state.

14. The damping force variable valve assembly of claim 12, wherein the integrated soft valve port comprises:

a main body formed in a disk shape of a predetermined thickness, having the fitting hole formed at a center of the main body to pass therethrough and allowing the valve mount for fixing the valve disk to be fitted thereinto, and having the connection passages formed outside the fitting hole; and a sub body having a predetermined thickness, extending horizontally along a circumference of a lower end of the main body, and having a protrusion formed in the bottom surface of the integrated soft valve port so as to come into contact with an upper surface of the valve disk.

15. The damping force variable valve assembly of claim 14, wherein the sub body comprises:

a first sub body extending horizontally along the circumference of the lower end of the main body and protruding downward along a bottom surface rim; and a second sub body extending downward along a bottom surface rim of the first sub body.

16. The damping force variable valve assembly of claim 15, wherein the valve disk is located in a mounting groove formed between an inner circumferential surface of the second sub body and the bottom surface of the integrated soft valve port.

17. A damping force variable shock absorber comprising a damping force variable valve assembly, wherein the damping force variable valve assembly comprises:

an integrated soft valve port having one end connected to the shock absorber, a connection passage formed in the integrated soft valve to allow a working fluid to flow from the shock absorber, and a valve disk provided at a bottom surface of the integrated soft valve port to be in close contact therewith;

a valve housing having a hollow cylindrical shape, and having an inner circumferential surface of a front end coupled to an outer circumferential surface of the integrated soft valve port; and a main valve part disposed underneath the integrated soft valve port in the valve housing, wherein the integrated soft valve port comprises:

a main body formed in a disk shape of a predetermined thickness, having a fitting hole formed at a center of the main body to pass therethrough and allowing a valve mount for fixing the valve disk to be fitted therein, and the connection passage formed outside the fitting hole; and a sub body having a predetermined thickness, extending horizontally along a circumference of a lower end of the main body, and having a protrusion formed in the bottom surface of the integrated soft valve port so as to come into contact with an upper surface of the valve disk, and wherein a plurality of support parts are formed in the outer circumferential surface of the integrated soft valve port to protrude horizontally, the support parts being disposed at predetermined intervals along a circumferential direction, wherein the support parts are provided as three support parts and disposed at the predetermined intervals of 120° along the circumferential direction.

* * * * *